J. R. NOCK 1,578,350

SHIP STEERING AND PROPELLING MECHANISM

Filed Sept. 30, 1925      6 Sheets-Sheet 5

Inventor
John R. Nock

Witnesses
C. E. Churchman Jr.
James W. Wright

By Richard B. Owen
Attorney

Patented Mar. 30, 1926.

1,578,350

UNITED STATES PATENT OFFICE.

JOHN R. NOCK, OF BROOKLYN, NEW YORK.

SHIP STEERING AND PROPELLING MECHANISM.

Application filed September 30, 1925. Serial No. 59,625.

*To all whom it may concern:*

Be it known that I, JOHN R. NOCK, a subject of the King of Great Britain, residing at Brooklyn, in the county of Kings and State of New York, have invented certain new and useful Improvements in Ship Steering and Propelling Mechanism, of which the following is a specification.

This invention appertains to ship propelling and steering mechanisms and the primary object of the invention is to provide a novel mechanism for both steering and driving a vessel, the mechanism being so constructed as to eliminate vibration.

Another object of the invention is the provision of novel vertical driving vanes mounted for oscillating movement in a horizontal plane, with novel means for operating the driving vanes synchronously and in opposite directions for driving the ship and to reduce vibration to a minimum.

A further object of the invention is to provide novel means for operating said driving vanes so as to bring about the expeditious and effective working thereof.

A further object of the invention is to provide novel means for shifting the position of the operating mechanism and the driving vanes in order to bring about the desired change of direction of the travel of the vessel.

A further object of the invention is to provide novel means for constructing the driving vanes in order to insure a certain flexibility thereto so as to bring about the effective operation of the ship with a minimum amount of vibration.

A still further object of the invention is to provide a novel combined means for propelling and steering a vessel which will be durable and efficient in use, one that will be simple and easy to manufacture and one which can be incorporated with a conventional vessel at a small cost.

With these and other objects in view, the invention consists in the novel construction, arrangement and formation of parts, as will be hereinafter more specifically described, claimed and illustrated in the accompanying drawings, in which drawings:

Figure 1:
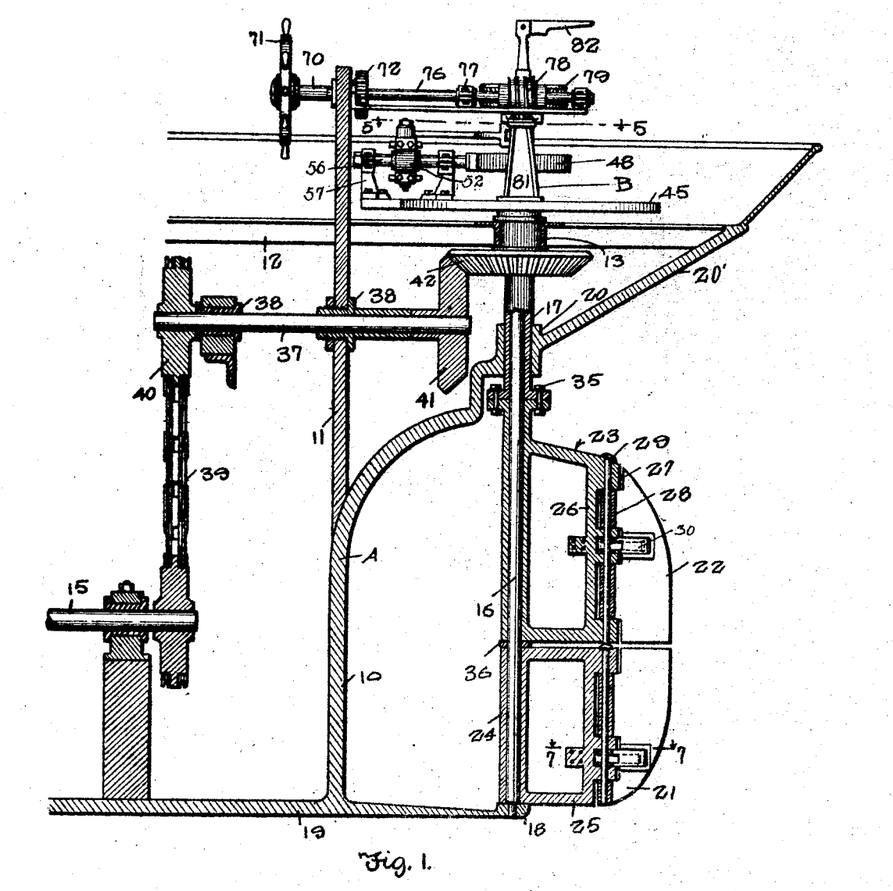
Figure 1 is a fragmentary longitudinal section through the stern of a vessel showing the novel propelling and steering mechanism incorporated therewith.
Figure 2:
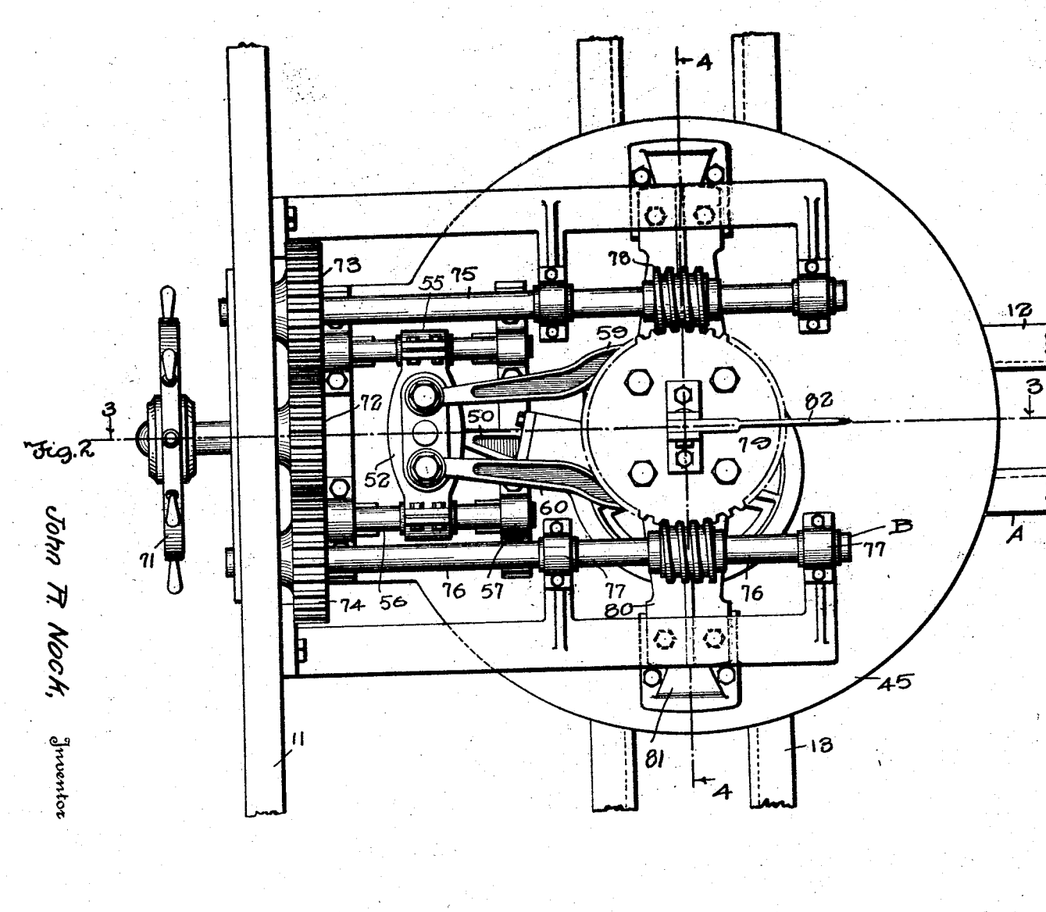
Figure 2 is a top plan view of the said novel steering and propelling mechanism.
Figure 3:
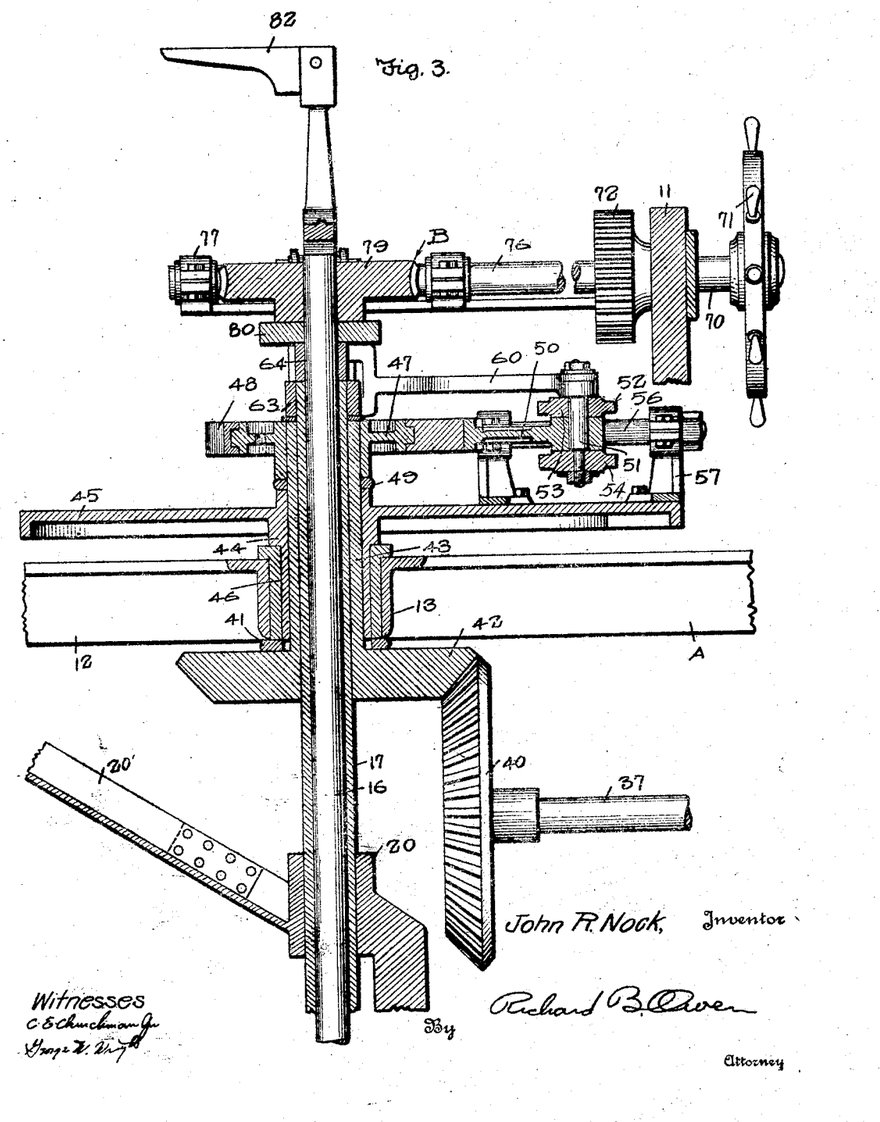
Figure 3 is an enlarged sectional view taken on the line 3—3 of Figure 2 looking in the direction of the arrows illustrating the driving and steering means.
Figure 4:
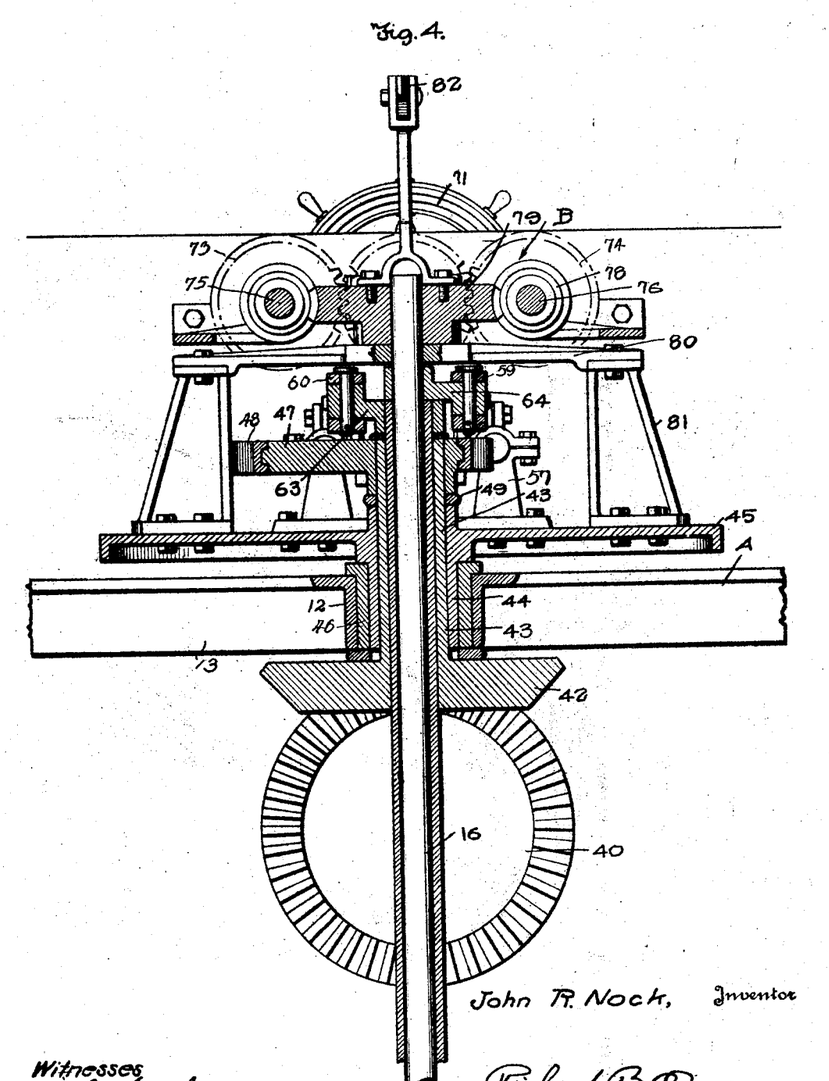
Figure 4 is a transverse section through the driving and steering mechanism taken on the line 4—4 of Figure 2 looking in the direction of the arrows.
Figure 5:
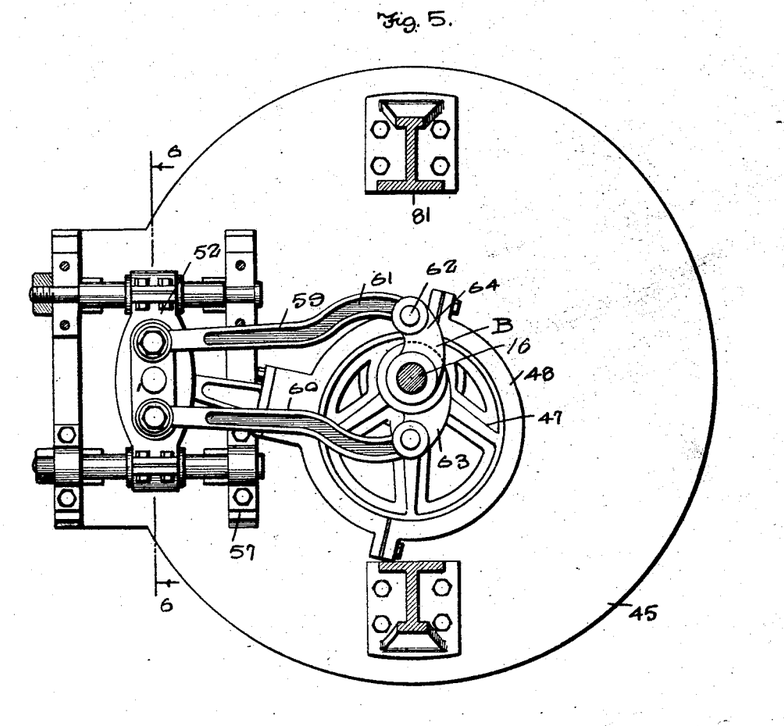
Figure 5 is a horizontal section taken on the line 5—5 of Figure 1 looking in the direction of the arrows illustrating a part of the novel propelling mechanism.
Figure 6:
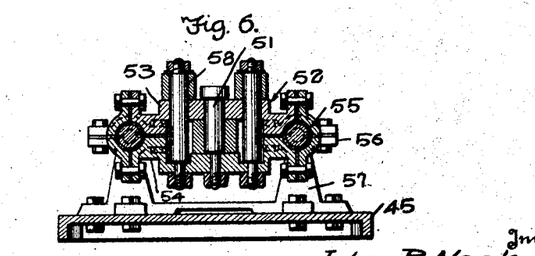
Figure 6 is a transverse section taken on the line 6—6 of Figure 5 looking in the direction of the arrows illustrating the novel cross head of said propelling mechanism.
Figure 7:
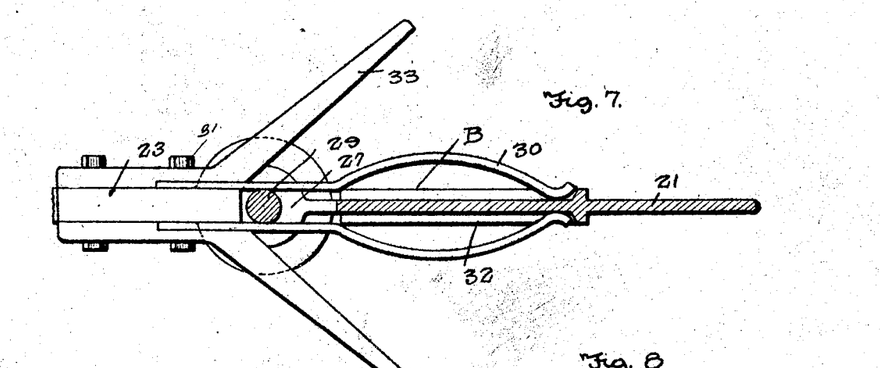
Figure 7 is a detail horizontal section through one of the driving vanes and supporting frame therefor taken on the line 7—7 of Figure 1.
Figure 8:
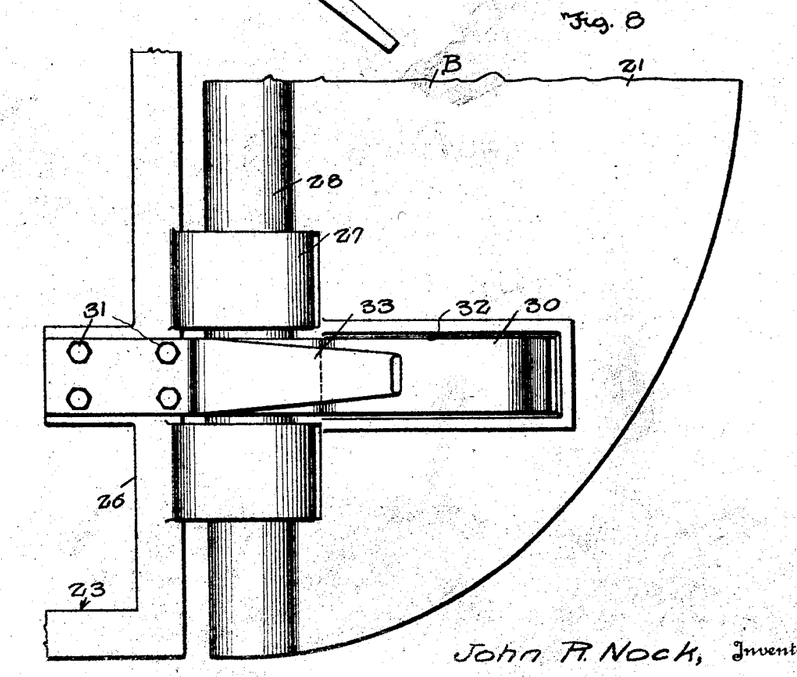
Figure 8 is an enlarged fragmentary side elevation of the lower driving vane and mounting therefor.

Referring to the drawings in detail, wherein similar reference characters designate corresponding parts throughout the several views, the letter A generally indicates a vessel and B the novel propelling and steering mechanism therefor. The vessel A can be of any conventional type and includes the hull 10 having the usual stern bulk head 11, the fore and aft beams 12 and the transverse beams 13. Only a sufficient portion of the vessel A is shown to illustrate the invention and it is to be noted in Figure 1 that the stern thereof is shaped substantially in the conventional way. Extending longitudinally of the hull 10 is the main drive shaft 15 which is operated in any preferred way from the drive engine, (not shown) of the vessel.

The improved propelling and steering mechanism B embodies a vertical shaft 16 which extends centrally through the stern of the vessel and a hollow rotatable shaft 17 which partially houses the shaft 16. The lower end of the shaft 16 is rotatably supported by a thrust bearing 18 carried by the keel 19 of the vessel. The hollow rotatable shaft 17 adjacent to the lower end thereof is supported by a bearing boss 20 formed on or carried by a counter beam 20'. In order to bring about the steering and propelling of the vessel the lower end of the shaft 16 carries a lower drive vane 21, while the hollow shaft carries an upper drive vane 22. The drive vanes 21 and 22 are constructed substantially the same and are arranged one above the other. Each includes a frame 23 having a sleeve 24 and radially extending arms 25. The arms 25 support an outer upright frame bar 26 which in turn carries bearing lugs 27 which receive therebetween barrels 28 formed on the inner edges of the drive vanes 21 and 22. Suitable head pins 29 are extended through the bearing ears 27 and the hinge barrels 28. The drive vanes are normally held in a predetermined position parallel with the frames 23 by means of the relatively heavy leaf springs 30 which are bolted or otherwise secured as at 21 to the opposite sides of the said frames 23. The outer ends of the relatively heavy leaf springs 30 are slidably mounted within suitable guideways 32 formed on the driving vanes 21 and 22.

In order to positively limit the swinging movement of the vanes relative to the frames 23, each of the frames have bolted or formed thereon diverging stop arms 33 which are arranged at an oblique angle to the said frames. The sleeve 24 of the lower frame 23 is keyed or otherwise secured directly to the shaft 16 for movement therewith, while the sleeve 24 of the upper frame 23 is coupled with the lower end of the hollow shaft 17, as at 35 for movement therewith. A suitable wear washer 36 is disposed upon the shaft 16 directly between the sleeves of the upper and lower frames.

In order to bring about the operation of the said shafts 16 and 17 a novel operating mechanism is provided, which includes a counter shaft 37 arranged directly above the main drive shaft 15. This shaft 37 is rotatably mounted in suitable bearings 38 which can be carried by the bulk head 11 and other suitable supports. The shaft 37 is driven from the main drive shaft 15 in any preferred way, such as by a silent sprocket chain 39 trained over the sprocket wheels 40 secured respectively to the said shaft 15 and the shaft 37. The rear end of the counter drive shaft 37 has keyed or otherwise secured thereto a drive beveled gear 41 which meshes with a beveled gear 42 keyed or formed on a drive sleeve 43 which rotatably receives the hollow shaft 17. This sleeve 43 in turn has rotatably mounted thereon the hub 44 of a turn table 45, which will be hereinafter more fully described. It is to be noted that the turn table 45 has the hub thereof mounted within a suitable bushing 46 which is carried by the fore and aft beams 12 and the transverse beams 13. The sleeve 43 of the bevel gear 42 has keyed or otherwise secured thereto the cam or eccentric wheel 47 which is confined within the eccentric strap 48. A suitable wear washer 49 can be interposed between the eccentric wheel 47 and the hub 44 of the table 45. The cam strap 48 has rigidly secured thereto a pitman or pusher rod 50 which is in turn connected by means of a suitable bolt 51 with the cross head 52. The cross head 52 preferably includes upper and lower companion plates 53 and 54 the terminals of which carry suitable cross head guides 55 for the reception of the cross head guide rods 56. These cross head guide rods 56 are secured to suitable supporting brackets 57 bolted or otherwise affixed to the upper surface of the table 45. The cross head 52 also supports a pair of spaced pivot or bearing pins 58 on opposite sides of the pivot pin 51 and rockably mounted on said bearing pins 58 are the rearwardly extending pitman or operating rods 59 and 60. The rear ends of these operating rods 59 and 60 are arcuated as at 61 in opposite direction and pivotally secured by means of crank pins 62 to oppositely extending arcuate cranks 63 and 64 respectively which are secured by any preferred means such as by keys or the like to the shaft 16 and the hollow shaft 17.

By this construction, it can be seen that when movement is imparted to the counter drive shaft 37 from the main drive shaft 15 that the cam or eccentric wheel 47 will be operated through the medium of the bevel gears 40, 42 and sleeve 43. Operation of the said cam or eccentric 47 will operate the cam strap 48 thus setting the cross head 52 in motion. The reciprocation of the cross head 62 will operate the cranks 63 and 64 in an arc of substantially one hundred and twenty degrees in opposite directions which will oscillate the shafts 16 and 17 in opposite directions thus bringing about the movement of the driving vanes 21 and 22 in opposite direction. It can be seen that the vanes 21 and 22 move toward each other to force the water from between the same and back of the boat thus propelling the boat forward and that when the same vanes move in opposite direction, that the same action takes place and the water is again forced rearwardly. This brings about a continuous uninterrupted drive of the boat and the provision of the oppositely operating vanes 21 and 22 reduces the vibration of the bolt to a minimum.

In order to bring about the steering of the vessel it is merely necessary to change the angle of the frames 23 from one side of the longitudinal center of the hull to the other and it can be seen that the vanes oscillating will bring about the change of course of the vessel.

A novel mechanism has been devised for changing the position of the said frames 23 to one side of the longitudinal axis of the vessel or the other and this means includes a mechanism for rotating the table 45 which carries the operating mechanism for the said vanes. The means for rotating the table 45 embodies a substantially horizontally disposed steering shaft 70, the forward end of which has affixed thereto any conventional type of steering wheel 71. This steering shaft 70 is rotatably supported in suitable bearings carried by the bulk head 11 and the rear end of the shaft has keyed or otherwise secured thereto a spur wheel 72 meshing with the spur wheels 73 and 74 disposed on the opposite sides thereof. The spur gear wheels 73 and 74 are keyed or otherwise secured to the operating shafts 75 and 76 respectively carried by suitable bearings 77 which can be attached to any appropriate part of the vessel such as the bulk head 11. The shafts 75 and 76 have keyed thereto worms 78 which mesh with the opposite sides of a worm wheel 79 rotatably mounted upon the upper end of the shaft 16. This worm wheel 79 is affixed to a diametrically extending bracket 80 which rotatably receives the shaft 16 and forms a support therefor. The opposite terminals of the diametrically extending bracket 80 are connected by means of standards or brackets 81 to the upper face of the table 45. It is thus obvious from the foregoing construction that upon movement of the steering wheel 71 that movement will be imparted to the shafts 75 and 76 which will in turn rotate the worm wheel 79 causing the rotation of the table 45 which will change the position of the cross head 52 relative to the longitudinal center of the ship. The changing of the position of the cross head will naturally swing the arms or pitman rods 59 and 60 to one side or the other of the ship thus causing the effective changing of the angle of the frames 23, carrying the driving vanes 21 and 22 relative to the longitudinal axis of the vessel.

To permit the position of the frames 23 to be known at all times by the helmsman of the vessel, the upper end of the worm wheel 79 has bolted or otherwise secured thereto the indicator arm 82 and this arm normally points in the direction of travel of the vessel.

From the foregoing description it can be seen that a novel mechanism has been provided which will effectively propel and guide the vessel without undue vibration and in an expeditious and novel manner.

Changes in details may be made without departing from the spirit or scope of this invention, but:

What I claim as new is:

1. A ship propelling mechanism comprising a pair of superimposed driving vanes formed to provide guiding grooves mounted for oscillatory movement, means for oscillating said vanes in opposite directions relative to one another, the vanes being mounted upon vertical pivots and resilient means engaging in said guiding grooves and normally holding the vanes in a predetermined position.

2. In a ship propelling device, a pair of groove faced driving vanes arranged one upon the other for oscillatory movement in a horizontal plane, means for actuating said vanes in opposite directions relative to one another, the vanes being mounted upon vertical pivots, resilient means engaging the grooves in the opposite faces of said vanes for normally holding the vanes in a predetermined position, and positive stops arranged on the opposite sides of the vanes for limiting swinging movement thereof on said vertical pivots.

3. In a ship propelling mechanism, a plurality of driving vanes arranged one upon the other for oscillatory movement in a horizontal plane, means for actuating the vanes in opposite directions relative to one another, the vanes being mounted upon vertical pivots, relatively heavy leaf springs slidably engaging the opposite faces of the vanes for normally holding the vanes in a predetermined position, the vanes being provided with guideways for receiving said springs and rigid stops arranged on the opposite sides of said vanes for limiting the swinging movement thereof on said vertical pivots.

4. In a propelling mechanism for vessels, a flat driving vane, an oscillatory supporting frame therefor, a hinge barrel formed on the inner edge of the said vane, pivot ears carried by the supporting frame, a vertical pivot pin extending through said barrel and ears, the opposite faces of the vane being provided with guideways, and leaf springs rigidly secured to the opposite faces of the supporting frame for slidably engaging the side wings of said vane.

5. In a ship propelling mechanism, a pair of oscillatory frames arranged one upon the other and adapted to swing upon the same vertical axis, means for moving the frames synchronously in opposite directions relative to one another, driving vanes associated with said oscillatory frames, and means for changing the angle of said vanes relatively to the median line of said vessel.

6. In a ship propelling mechanism, a plurality of driving vanes arranged at the longitudinal axis of the vessel at the stern thereof mounted one above the other for movement upon the same vertical axis, means for synchronously operating said vanes toward and away from each other, and means for causing operation of said vanes in a plane disposed at an angle to the median axis of said ship.

7. In a ship propelling mechanism, a vertically disposed operating shaft, a hollow shaft rotatably mounted upon the first shaft, driving vanes mounted one above the other and secured to and operated by said shafts, means for synchronously operating said shafts in opposite directions, and means for changing the angular disposition of said vanes simultaneously.

8. The combination with the hull of a vessel, of a propelling mechanism for the vessel including a vertical shaft rotatably carried by the stern of the vessel and extending below the same, a hollow shaft rotatably receiving the first mentioned shaft and extending below the stern of the vessel, frames mounted one upon the other connected independent of one another to said shafts, driving vanes connected with said frames, driving mechanism mounted above said shafts for oscillating the frames in opposite directions, and means for changing the angular position of said frames relatively to the longitudinal axis of the vessel.

9. The combination with the hull of a vessel, of a propelling mechanism therefor including a main drive shaft, a vertically disposed shaft rotatably carried by the stern of the vessel and extending below the same, a hollow rotatable shaft rotatably receiving the first mentioned shaft, driving vanes independently associated with said shafts, crank arms secured to said shafts independently of one another and a reciprocatory cross head, pitman rods independently connecting the crank arms with said cross heads, means for reciprocating said cross head from said main drive shaft, and means for moving the driving vanes to guide the vessel.

10. The combination with a vessel, of propelling means therefor including a main drive shaft, a hollow rotatable shaft, a solid shaft rotatably mounted within the hollow shaft, water engaging propelling members independently associated with said shafts, a drive sleeve rotatably mounted upon the hollow shaft, means operatively connecting the drive sleeve with said main drive shaft, a cam connected to and operated by said drive sleeve, a cam strap, a reciprocatory cross head, means connecting the cam strap with the cross head, a crank arm rigidly secured to the hollow and solid shafts, and pitman rods connecting the outer ends of said crank arms to said cross head.

11. The combination with the hull of a vessel, of propelling means for the vessel including a main drive shaft, a counter shaft arranged above the main drive shaft, means for driving the counter shaft from the main drive shaft, a rotatable hollow shaft, a rotatable solid shaft mounted within the hollow shaft, water engaging propelling members secured to said solid and hollow shaft, a drive sleeve rotatably mounted upon the hollow shaft, bevel gearing connecting the counter shaft and drive sleeve together, an eccentric secured to the drive sleeve for movement therewith, a cam strap receiving the eccentric, a reciprocatory cross head, means connecting the cross head with the cam strap, oppositely extending cranks rigidly secured to the solid and hollow shafts, and pitman rods pivotally connected to the outer ends of the crank arms and to said cross head.

12. A combined ship propelling and guiding mechanism embodying a plurality of driving vanes arranged one upon the other, means for operating the vanes synchronously toward and away from one another, and means for shifting the position of the vanes on one side of the longitudinal axis of the ship or the other to bring about the change of course thereof.

13. A combined ship propelling and steering mechanism comprising driving members arranged one above the other for swinging movement on the same vertical axis, means for operating said driving members toward and away from each other, and means for shifting the position of said driving members to one side of the longitudinal axis of the ship or the other to bring about the change of course thereof.

14. A combined ship propelling and driving mechanism embodying a hollow rotatable shaft and a solid rotatable shaft arranged within the hollow shaft, driving members connected with the lower ends of the shaft, operating cranks secured to the opposite ends of the shafts, means for actuating said cranks, and means for varying the position of said crank operating mechanism for bringing about the change of course of the ship.

15. A combined ship propelling and steering mechanism, a hollow rotatable shaft, a solid rotatable shaft mounted within the hollow shaft, driving members carried by the lower ends of said shafts, a driving sleeve, means for operating the driving sleeves, the said sleeves being rotatably mounted upon the hollow shaft, a turn table rotatably mounted upon the driving sleeves, an eccentric secured to the driving sleeve, a cam strap receiving the eccentric, cross head guides rigidly carried by the turn table, a cross head reciprocally mounted upon said guides, means for actuating the cross head from said eccentric strap, operatively extending cranks rigidly secured to the hollow and solid shafts, pitman rods connected to the outer ends of said cranks and to the cross head, and means for turning the turn table, as and for the purpose specified.

16. A combined ship propelling and steering mechanism comprising a hollow rotatable shaft, a solid rotatable shaft mounted within the hollow shaft, driving members for engaging the water carried by said shafts, a driving sleeve rotatably mounted upon the hollow shaft, a turn table rotatably mounted upon the driving sleeve, a cam keyed to the drive sleeve, means for operating the drive sleeve continuously, a cam strap upon the cam, cross head guides secured to the upper surface of the turn table, a cross head reciprocally mounted upon said guides, means for operating the cross head from said cam strap, oppositely extending cranks rigidly secured to the hollow and solid shafts, a worm wheel rotatably mounted upon the hollow shaft, a steering shaft, a steering wheel for said steering shaft, counter steering shafts disposed upon the opposite sides of the steering shaft, means for actuating said counter steering shafts from the steering shafts, and worms meshing with the opposite sides of the worm wheel carried by the counter steering shaft, and means connecting the worm wheel with said turn table.

17. A combined ship propelling and steering mechanism comprising a pair of rotatable shafts mounted one within the other, water propelling engaging members connected with said shafts, a turn table rotatably mounted about said shafts, a crank arm rigidly secured to each shaft, cross head guides rigidly carried by the turn table, a cross head reciprocally mounted upon said guides, pitman rods connecting the cross head with said crank arms, means for turning the turn table, and an indicating arm rotatable with said turn table.

In testimony whereof I affix my signature.

JOHN R. NOCK.